(12) United States Patent
Fujisawa et al.

(10) Patent No.: US 12,435,817 B2
(45) Date of Patent: Oct. 7, 2025

(54) PIPE SUPPORTING STRUCTURE

(71) Applicant: MITSUBISHI HEAVY INDUSTRIES, LTD., Tokyo (JP)

(72) Inventors: Ryutaro Fujisawa, Tokyo (JP); Hikaru Kurosaki, Tokyo (JP); Kohei Hatano, Tokyo (JP); Toyosei Aota, Kanagawa (JP); Yoshimasa Tsumura, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/222,133

(22) Filed: Jul. 14, 2023

(65) Prior Publication Data

US 2023/0358339 A1    Nov. 9, 2023

Related U.S. Application Data (63) Continuation of application No. PCT/JP2021/027956, filed on Jul. 28, 2021.

(30) Foreign Application Priority Data

Jan. 28, 2021   (JP) .................................. 2021-012088

(51) Int. Cl.
    *F16L 3/02*    (2006.01)
    *F01D 25/30*   (2006.01)

(52) U.S. Cl.
    CPC ............... *F16L 3/02* (2013.01); *F01D 25/30* (2013.01)

(58) Field of Classification Search
    CPC ..... F16L 3/02; F16L 3/26; F16L 59/14; F16L 3/16; F01D 25/30

USPC ............................................................ 248/65
See application file for complete search history.

(56) References Cited

U.S. PATENT DOCUMENTS

| | | | | |
|---|---|---|---|---|
| 675,104 | A * | 5/1901 | Oberle | F16L 3/26 248/49 |
| 675,106 | A * | 5/1901 | Oberle | F16L 3/26 403/90 |
| 2,684,222 | A * | 7/1954 | Miller | F16L 3/1218 248/354.3 |

(Continued)

FOREIGN PATENT DOCUMENTS

| | | |
|---|---|---|
| JP | 56-110326 | 9/1981 |
| JP | 5-263971 | 10/1993 |

(Continued)

OTHER PUBLICATIONS

UCF College Physics (Year: 2016).*

(Continued)

*Primary Examiner* — Muhammad Ijaz
(74) *Attorney, Agent, or Firm* — Wenderoth, Lind & Ponack, L.L.P.

(57) ABSTRACT

A pipe supporting structure includes: a plate-like member being into contact with an outside surface of a pipe; a tube-like member having a tubular shape and configured to support the plate-like member; and a base configured to support the tube-like member, wherein the plate-like member includes a supported portion supported by the tube-like member and an inner side portion surrounded by the supported portion, and the inner side portion has a smaller heat capacity per unit volume than the supported portion.

15 Claims, 8 Drawing Sheets

(56) References Cited

U.S. PATENT DOCUMENTS

| | | | | |
|---|---|---|---|---|
| 3,298,644 | A * | 1/1967 | Sherburne | F16L 3/16 248/55 |
| 3,315,927 | A * | 4/1967 | Malloy | F16L 3/16 248/55 |
| 3,833,023 | A * | 9/1974 | Rea | F16L 59/16 220/592.25 |
| 4,429,497 | A * | 2/1984 | Dibernardi | F16L 3/04 248/65 |
| 4,530,478 | A * | 7/1985 | McClellan | F16L 59/135 248/62 |
| 5,110,073 | A * | 5/1992 | Schoenky | F16L 3/02 248/70 |
| 5,162,620 | A * | 11/1992 | Ross | F01D 25/30 181/220 |
| 5,749,548 | A * | 5/1998 | Tamura | F16L 59/135 248/65 |
| 5,924,656 | A * | 7/1999 | Okada | F16L 3/00 248/58 |
| 6,219,989 | B1 * | 4/2001 | Tumura | E04B 1/2403 52/274 |
| 6,575,412 | B2 * | 6/2003 | Klezath | F16L 3/1091 248/65 |
| 7,874,435 | B2 * | 1/2011 | Olivier | B08B 9/055 206/319 |
| 7,950,609 | B2 * | 5/2011 | Pothanikat | F16L 55/035 248/65 |
| 9,523,380 | B2 * | 12/2016 | Brown | F16L 3/1058 |
| 10,240,690 | B2 * | 3/2019 | Lisin | E02D 27/35 |
| 10,774,951 | B2 * | 9/2020 | Ball | F16L 3/127 |
| 11,085,569 | B2 * | 8/2021 | Bootsveld | F16L 55/035 |
| 2009/0092469 | A1 * | 4/2009 | Sekimoto | H01L 21/67742 204/194 |
| 2012/0168570 | A1 * | 7/2012 | Smith | F16L 3/00 248/65 |
| 2012/0181396 | A1 * | 7/2012 | Simmons | F16L 3/18 248/72 |
| 2016/0131280 | A1 * | 5/2016 | Brown | B29C 65/48 29/525.11 |
| 2018/0238194 | A1 * | 8/2018 | Tejima | F01D 25/12 |
| 2020/0224794 | A1 * | 7/2020 | Tamme | F16L 1/06 |
| 2020/0318760 | A1 * | 10/2020 | Comalander | F16L 3/18 |
| 2020/0361403 | A1 * | 11/2020 | Marcolongo | H02G 3/32 |
| 2023/0356628 | A1 * | 11/2023 | Boyd | F28F 1/422 |
| 2023/0358339 | A1 * | 11/2023 | Fujisawa | F01D 25/30 |
| 2024/0102599 | A1 * | 3/2024 | Ding | F16L 59/14 |

FOREIGN PATENT DOCUMENTS

| | | |
|---|---|---|
| JP | 1-165432 | 3/1999 |
| JP | 2010-203256 | 9/2010 |
| JP | 2013-134229 | 7/2013 |
| JP | 2013-174451 | 9/2013 |
| JP | 2014-119090 | 6/2014 |
| JP | 6639514 | 2/2020 |
| JP | 2020-34117 | 3/2020 |

OTHER PUBLICATIONS

International Search Report and Written Opinion issued Oct. 12, 2021 in corresponding International (PCT) Application No. PCT/JP2021/027956, with English translation.

* cited by examiner

PIPE SUPPORTING STRUCTURE

CROSS-REFERENCE TO RELATED APPLICATION

This application is a continuation of PCT international application No. PCT/JP2021/027956 filed on Jul. 28, 2021 which claims the benefit of priority from Japanese patent application No. 2021-012088 filed on Jan. 28, 2021, the entire contents of which are incorporated herein by reference.

TECHNICAL FIELD

The present invention relates to a pipe supporting structure.

BACKGROUND ART

Japanese Unexamined Patent Application Publication No. H05-263971 describes an example of a known configuration for supporting a pipe in which a fluid such as gas flows.

The pipe supporting structure described in Japanese Unexamined Patent Application Publication No. H05-263971 clamps a pipe, with a reinforcing plate provided between the structure and a support. This configuration requires a large number of processing steps. In view of this, a configuration has been proposed in which a plate-like member is fixed to the outside surface of the pipe by welding, and a supporting structure such as a tube-like member is welded to the plate-like member.

With the configuration in which the plate-like member is fixed to the outside surface of the pipe by welding, for example, a state where temperature differs between the inside and the outside of the pipe may lead to a temperature difference between the pipe and the plate-like member. The temperature difference leads to deformation of the plate-like member resulting in production of thermal stress which may result in damaging of the pipe supporting structure, such as the plate-like member being peeled from the pipe for example.

The present invention has been made in view of the above, and an object of the present invention is to provide a pipe supporting structure with which damaging due to thermal stress can be suppressed.

SUMMARY OF THE INVENTION

A pipe supporting structure according to the present invention includes: a plate-like member to be in contact with an outside surface of a pipe; a tube-like member having a tubular shape and configured to support the plate-like member; and a base configured to support the tube-like member. The plate-like member includes a supported portion supported by the tube-like member and an inner side portion surrounded by the supported portion, and the inner side portion has a smaller heat capacity per unit volume than the supported portion.

Advantageous Effects of Invention

The present invention can provide a pipe supporting structure with which damage due to thermal stress can be suppressed.

DETAILED DESCRIPTION OF EMBODIMENTS

Now, with reference to the drawings, an embodiment of a pipe supporting structure according to the present invention will be described. Note that the invention is not limited to the specific embodiments described. In addition, components in the following embodiments include components that are substantially the same components or components that can be easily replaced by those skilled in the art.

Figure 1:
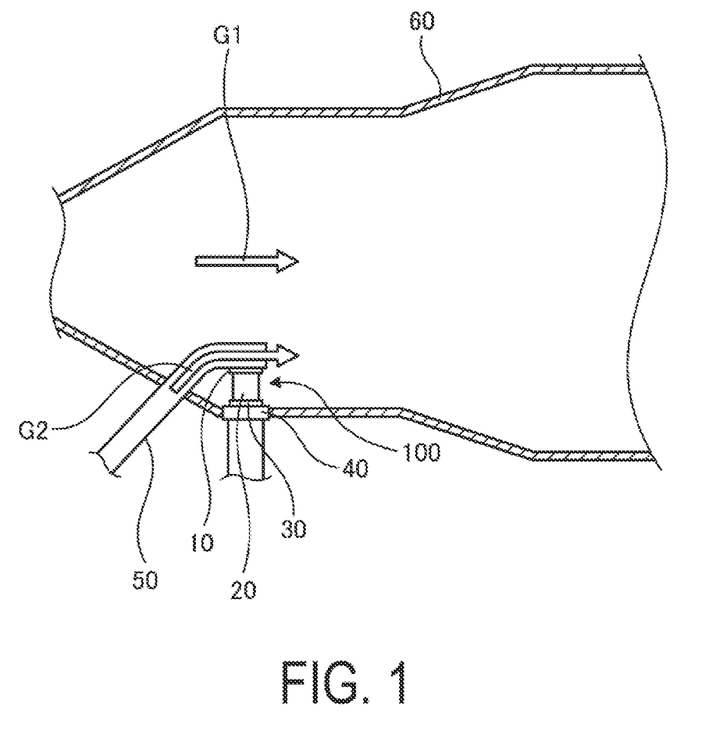
FIG. 1 is a diagram illustrating a mode under which a pipe supporting structure according to the present embodiment supports a pipe inside a duct.

FIG. 1 is a diagram illustrating a mode under which a pipe supporting structure 100 according to the present embodiment supports a pipe 50 inside a duct 60. The pipe supporting structure 100 supports the pipe 50 inserted in the duct 60. Examples of the duct 60 include an exhaust duct of a gas turbine. In this case, gas G1 flowing in the duct 60 is high-temperature gas. Note that the duct 60 is not limited to the exhaust duct of the gas turbine.

Examples of the pipe 50 include an extracted air pipe of a gas turbine. The pipe 50 may have a cylindrical tube shape or a rectangular tube shape. The pipe 50 is inserted in the duct 60 while being inclined with respect to a flow direction of the gas G1 flowing in the duct 60, and is bent to extend along the flow direction of the gas G1 in the duct 60. Gas G2 flowing in the pipe 50 is, for example, low-temperature gas having a temperature lower than that of the gas G1 that is high-temperature gas, meaning that there is a temperature difference between the gas G1 and the gas G2. The pipe 50 is not limited to the extracted air pipe of the gas turbine.

There is a predetermined temperature difference, based on the temperatures of the gas G1 and the gas G2, between the inside of the duct 60 and the inside of the pipe 50 (i.e., the inside and the outside of the pipe 50). With the pipe supporting structure 100 according to the present embodiment, the predetermined temperature difference that may occur between the inside and the outside of the pipe 50, due to the gas G1 and the gas G2 flowing is 100° C. or greater for example. This predetermined temperature difference is greater than a temperature difference that may occur under a natural environment, such as a possible temperature difference between summer and winter for example. Thus, the pipe 50 is placed in an environment where the predetermined temperature difference, for example, a temperature difference of 100° C. or greater, which is greater than a temperature difference that may occur under the natural environment may occur between the inside and the outside of the pipe 50.

Figure 2:
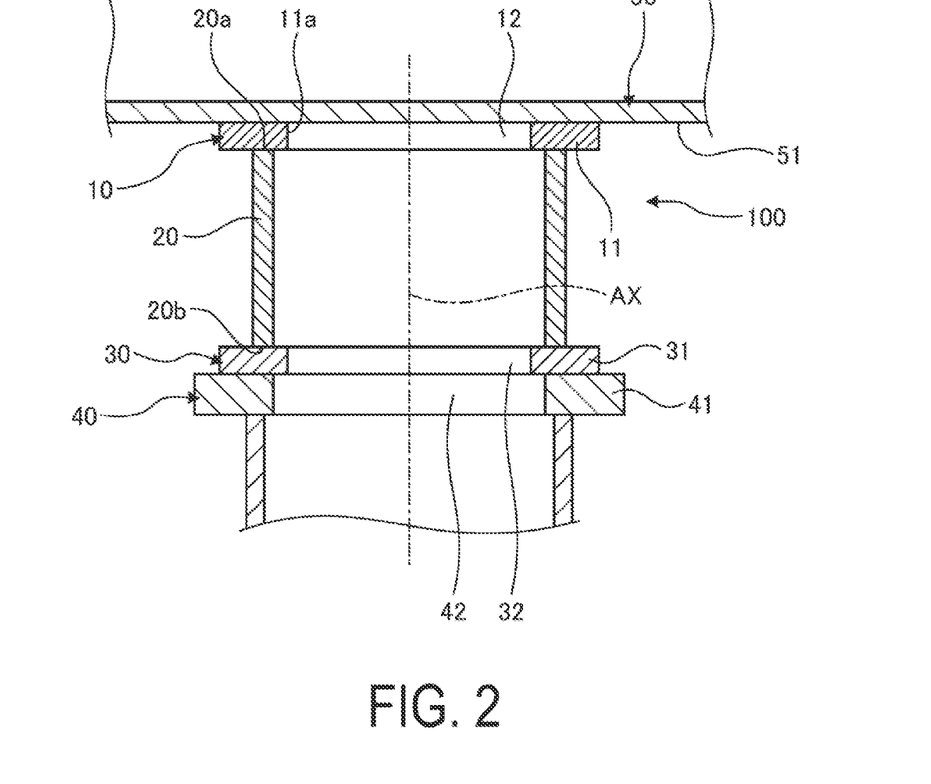
FIG. 2 is a diagram illustrating a cross-sectional configuration of an example of the pipe supporting structure.
Figure 3:
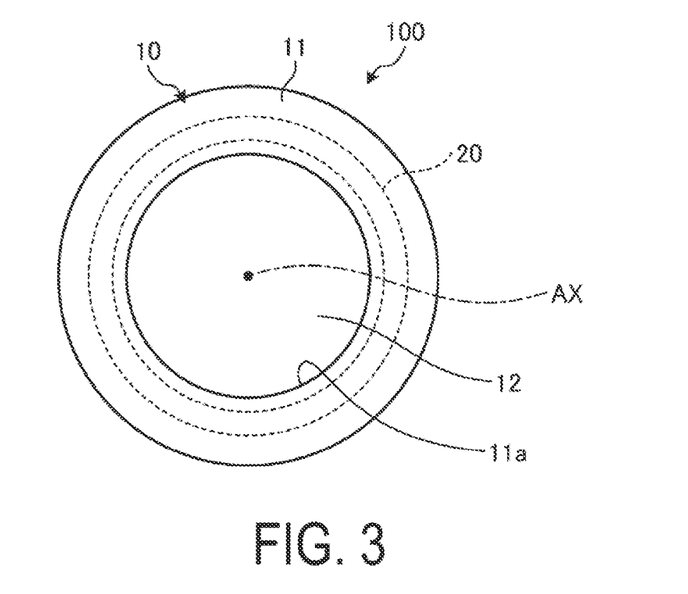
FIG. 3 is a diagram illustrating the pipe supporting structure as viewed from the pipe side.

FIG. 2 is a diagram illustrating a cross-sectional configuration of an example of the pipe supporting structure 100. FIG. 3 is a diagram illustrating the pipe supporting structure 100 as viewed from the pipe 50 side. As illustrated in FIG. 2 and FIG. 3, the pipe supporting structure 100 includes a plate-like member (plate member) 10, a tube-like member (tube member) 20, a slide plate (second plate member) 30, and a base 40. The pipe supporting structure 100 supports the distal end side of a bend portion of the pipe 50.

The plate-like member 10 is in contact with an outside surface 51 of the pipe 50, and joined to the pipe 50 by welding such as full penetration welding or fillet welding for example. The plate-like member 10 has a circular shape as viewed in a supporting direction in which the pipe 50 is supported, that is, in an axial direction of a center axis AX of the tube-like member 20 described below.

The plate-like member 10 includes a supported portion 11 and an inner side portion (inner portion) 12. The supported portion 11 is an annular portion that includes the outside surface of the plate-like member 10, and is supported on and joined to the tube-like member 20 described below.

The inner side portion 12 is a circular portion placed on the inner side of the supported portion 11, as viewed in the supporting direction (the axial direction of the center axis AX) of the pipe 50. A heat capacity per unit volume of the inner side portion 12 is smaller than that of the supported portion 11. In the present embodiment, the inner side portion 12 is open. With this configuration, the amount of thermal deformation of the plate-like member 10 is small, compared with that in a configuration where the heat capacity per unit volume is the same between the inner side portion 12 and the supported portion 11. With this configuration where the plate-like member 10 is free of thermal deformation in the inner side portion 12, the thermal deformation of the plate-like member 10 as a whole can be suppressed.

The tube-like member 20 has a cylindrical shape with the center axis AX being at the center, and is fixed to the plate-like member 10 by welding or the like for example. The tube-like member 20 supports the plate-like member 10 while having one end surface 20a in contact with the plate-like member 10.

The slide plate 30 is placed between the tube-like member 20 and the base 40. The slide plate 30 supports the tube-like member 20, while being in contact with the other end surface 20b of the tube-like member 20. The slide plate 30 includes a support portion 31 that supports the tube-like member 20, and an opening portion 32 provided on the inner side of the support portion 31. With the slide plate 30 provided with the opening portion 32, the thermal deformation of the slide plate 30 is suppressed, as in the case of the plate-like member 10 described above.

The base 40 supports the tube-like member 20 with the slide plate 30 provided in between. The base 40 includes a support portion (base side support portion) 41 that supports the slide plate 30, and an opening portion 32 provided on the inner side of the support portion 41. With the base 40 provided with the opening portion 42, thermal deformation of the base 40 is suppressed, as in the case of the plate-like member 10 and the slide plate 30 as described above.

The pipe supporting structure 100 described above is provided to the pipe 50 as follows. First of all, the plate-like member 10 is positioned to be at a predetermined position of the outside surface 51 of the pipe 50, and the plate-like member 10 is joined to the pipe 50 by welding. After the plate-like member 10 is joined, the end surface 20a of the tube-like member 20 is brought into contact with the supported portion 11 of the plate-like member 10, and the tube-like member 20 is joined to the plate-like member 10 by full penetration welding.

After the tube-like member 20 is joined, the support portion 31 of the slide plate 30 is brought into contact with the other end surface 20b of the tube-like member 20, and the slide plate 30 is joined to the tube-like member 20 by full penetration welding. After the slide plate 30 is joined, the base 40 is arranged so as to support the slide plate 30. In this process, the base 40 is arranged so that the opening portion 42 corresponds to the opening portion 32 of the slide plate 30.

The pipe supporting structure 100 according to the present embodiment as described above includes: the plate-like member 10 that is brought into contact with the outside surface 51 of the pipe 50; the tube-like member 20 that has a tubular shape, and is fixed to the plate-like member 10, while having the one end surface 20a in the axial direction of the center axis AX in contact with the plate-like member 10; and the base 40 that supports the other end surface 20a of the tube-like member 20 in the axial direction. The inner side portion 12 of the supported portion 11 of the plate-like member 10 with which the tube-like member 20 is brought into contact as viewed in the axial direction has a smaller heat capacity per unit volume than the supported portion 11.

With this configuration, the heat capacity of the inner side portion 12 which is a portion of the plate-like member 10 where thermal deformation is likely to occur is small compared with the supported portion 11, whereby the thermal deformation of the plate-like member 10 due to a temperature difference between the pipe 50 and the plate-like member 10 can be suppressed. Thus, production of thermal stress in the plate-like member 10 can be suppressed, whereby damaging of the pipe supporting structure 100 due to the thermal stress can be suppressed.

The pipe 50, for which the pipe supporting structure 100 according to the present embodiment is used, may be placed in an environment where a predetermined temperature difference may occur between the inside and the outside of the pipe 50. The predetermined temperature difference is, for example, 100° C. or greater, which is greater than a temperature difference between the inside and the outside that may occur under a natural environment. With this configuration, thermal deformation of the plate-like member 10 due to a temperature difference between the pipe 50 and the plate-like member 10 can be suppressed, even when the predetermined temperature difference greater than a temperature difference that may occur between the inside and the outside of the pipe 50 under the natural environment.

In the pipe supporting structure 100 according to the present embodiment, the plate-like member 10 has a circular outer shape as viewed in the axial direction. Thus, the thermal deformation of the plate-like member 10 due to a temperature difference between the pipe 50 and the plate-like member 10 can be more reliably suppressed.

In the pipe supporting structure 100 according to the present embodiment, the inner side portion 12 of the plate-like member 10 is open. Thus, compared with a case where the inner side portion 12 is not open, a portion of the plate-like member 10 where the thermal deformation may occur is small, whereby damaging of the pipe supporting structure 100 due to thermal stress can be more reliably suppressed.

The pipe supporting structure 100 according to the present embodiment further includes the slide plate 30 placed between the tube-like member 20 and the base 40, and the inner side of the support portion 31 of the slide plate 30 supporting the tube-like member 20 is open. The inner side of the support portion 41 of the base 40, supporting the tube-like member 20, is open. Thus, a portion where the thermal deformation may occur in the pipe supporting structure 100 as a whole is small, whereby damaging of the pipe supporting structure 100 due to thermal stress can be more reliably suppressed.

Figure 4:
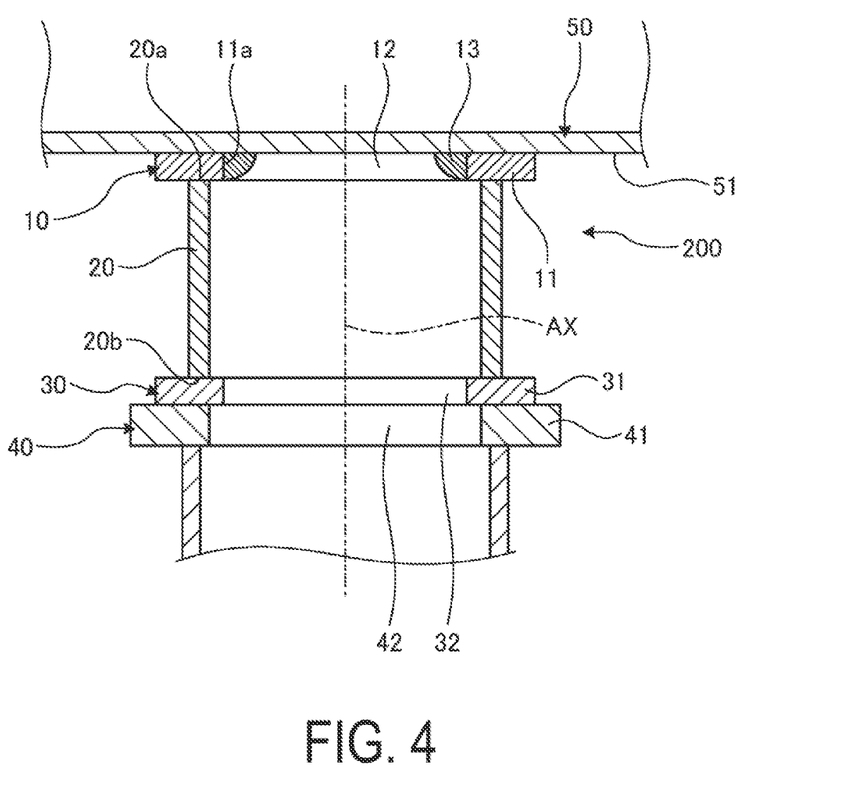
FIG. 4 is a diagram illustrating a cross-sectional configuration of another example of a pipe supporting structure.

FIG. 4 is a diagram illustrating a cross-sectional configuration of another example of a pipe supporting structure. A pipe supporting structure 200 illustrated in FIG. 4 includes the plate-like member 10. the tube-like member 20, the slide plate 30, and the base 40, as in the pipe supporting structure 100 described above. In the pipe supporting structure 200, an inside surface 11a, of the supported portion 11 of the plate-like member 10, facing the open inner side portion 12 is welded to the pipe 50 via a weld portion 13. With this configuration the plate-like member 10 is more rigidly joined to the pipe 50. Other configurations are the same as those of the pipe supporting structure 100 described above.

As described above, with the pipe supporting structure 200 according to the present embodiment, the inside surface 11a of the plate-like member 10 is welded to the pipe 50 via the weld portion 13, whereby the plate-like member 10 can be more rigidly joined to the pipe 50. Thus, damaging of the pipe supporting structure 200 due to thermal stress can be more reliably suppressed.

Figure 5:
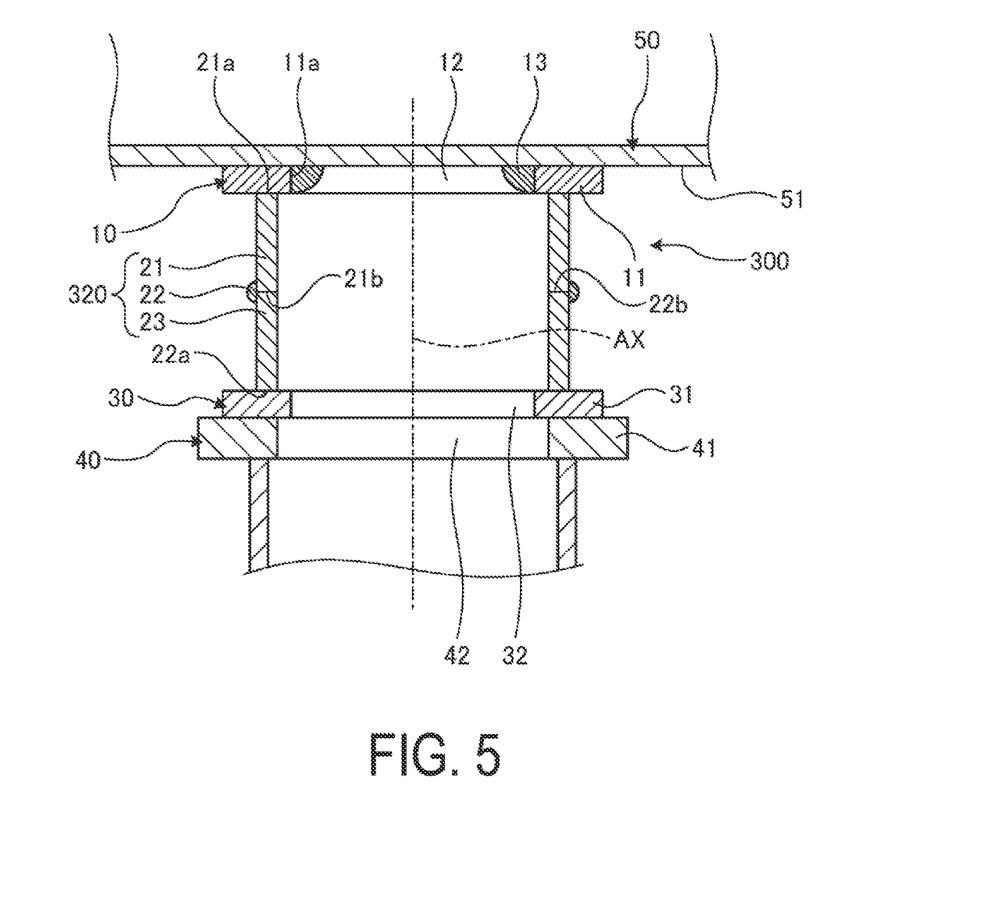
FIG. 5 is a diagram illustrating a cross-sectional configuration of another example of a pipe supporting structure.

FIG. 5 is a diagram illustrating a cross-sectional configuration of another example of a pipe supporting structure. A pipe supporting structure 300 illustrated in FIG. 5 includes the plate-like member 10, a tube-like member 320, the slide plate 30, and the base 40. The inside surface 11a of the plate-like member 10 facing the inner side portion 12 is welded to the pipe 50 via the weld portion 13. In the pipe supporting structure 300, the tube-like member 320 is provided in a state where two members that are a first tube-like member 21 and a second tube-like member 22 respectively on the plate-like member 10 side and the base 40 side in the axial direction are welded to each other via a weld portion 23. Other configurations are the same as those of the pipe supporting structure 200 described above.

The pipe supporting structure 300 is provided to the above-described pipe 50 in a manner similar to that described above. Specifically, first of all, the plate-like member 10 is joined to the pipe 50 by full penetration welding, and the first tube-like member 21 is joined to the supported portion 11 of the plate-like member 10 by full penetration welding. In this process, a joined portion between the first tube-like member 21 and the supported portion 11 can be checked from the inner circumferential side, from the end portion of first tube-like member 21 on the base side. Thus, whether there is a problem in the welding between the first tube-like member 21 and the supported portion 11 can be checked. After the first tube-like member 21 is joined, the second tube-like member 22 is joined to the first tube-like member 21 by welding.

As described above, in the pipe supporting structure 300 according to the present embodiment, the tube-like member 20 is provided in a state where the two members that are the first tube-like member 21 and the second tube-like member 22 respectively on the plate-like member 10 side and the base 40 side in the axial direction are welded to each other. Thus, for example, when the first tube-like member 21 is joined to the plate-like member 10, whether there is a problem in the joining between the first tube-like member 21 and the supported portion 11 can be checked.

Figure 6:
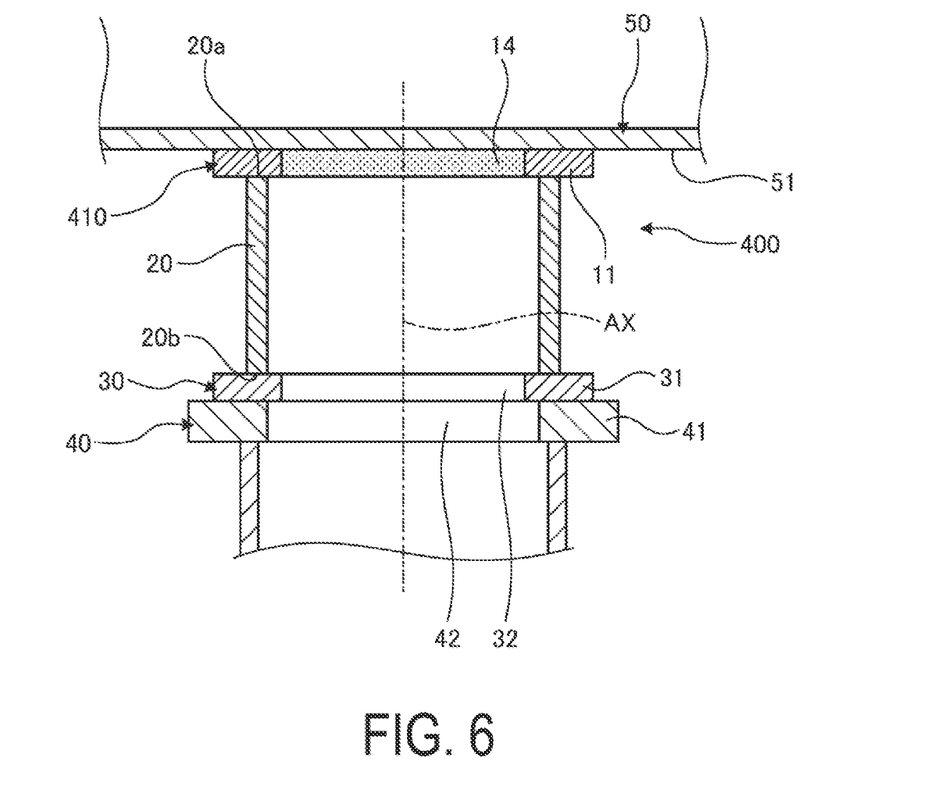
FIG. 6 is a diagram illustrating a cross-sectional configuration of another example of a pipe supporting structure.
Figure 7:
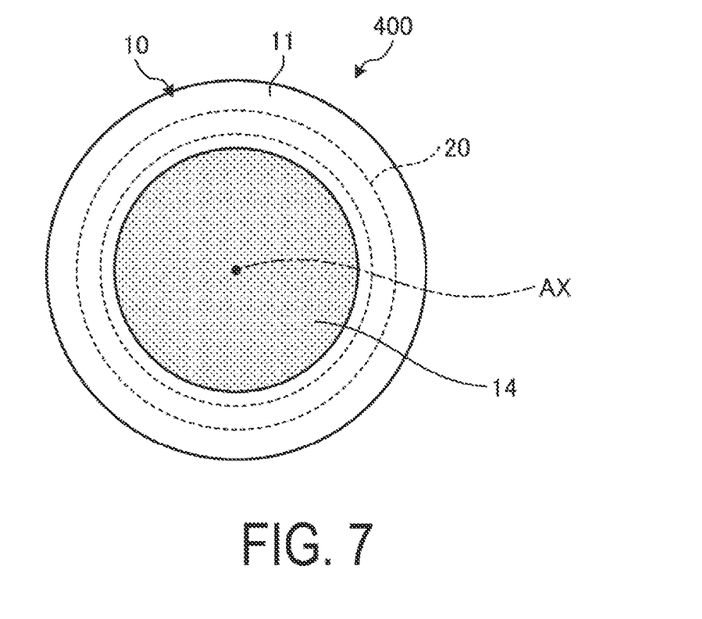
FIG. 7 is a diagram illustrating the other example of the pipe supporting structure as viewed from the pipe side.

FIG. 6 and FIG. 7 are diagrams illustrating a cross-sectional configuration of another example of a pipe supporting structure. FIG. 6 illustrates a cross-sectional configuration, and FIG. 7 illustrates a configuration as viewed from the pipe 50 side. A pipe supporting structure 400 as illustrated in FIG. 6 and FIG. 7 includes a plate-like member 410, the tube-like member 20, the slide plate 30, and the base 40. In the pipe supporting structure 400, the plate-like member 410 has a porous inner side portion 14. Thus, the heat capacity per unit volume is made smaller than that in a configuration where the inner side portion 14 is a solid portion as in the case of the supported portion 11, instead of being a porous portion. Thus, the thermal deformation of the inner side portion 14 is suppressed, whereby the production of thermal stress can be suppressed.

As described above, in the pipe supporting structure 400 according to the present embodiment, the plate-like member 410 has the porous inner side portion 14. Thus, the inner side portion 14 can have a smaller heat capacity per unit volume, whereby the thermal deformation of the inner side portion 14 can be suppressed, and thus the production of thermal stress can be suppressed.

Figure 8:
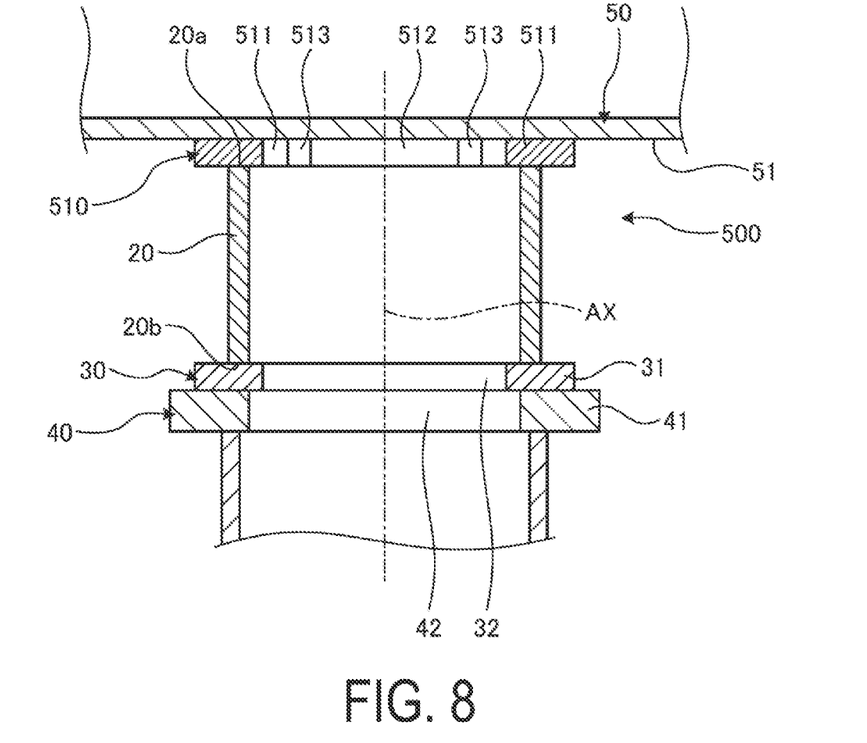
FIG. 8 is a diagram illustrating a cross-sectional configuration of another example of a pipe supporting structure.
Figure 9:
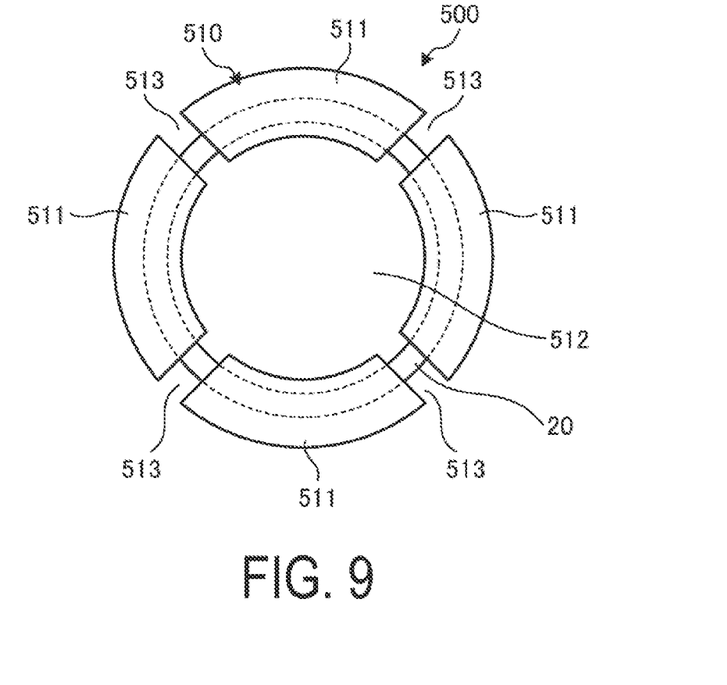
FIG. 9 is a diagram illustrating the other example of the pipe supporting structure as viewed from the pipe side.

FIG. 8 and FIG. 9 are diagrams illustrating a cross-sectional configuration of another example of a pipe supporting structure. FIG. 8 illustrates a cross-sectional configuration, and FIG. 9 illustrates a configuration as viewed from the pipe 50 side. A pipe supporting structure 500 as illustrated in FIG. 8 and FIG. 9 includes a plate-like member 510, the tube-like member 20, the slide plate 30, and the base 40.

In the pipe supporting structure 500, the plate-like member 510 includes a plurality of split members 511. The plurality of split members 511 are arranged in a direction around the center axis AX, to surround an inner side portion 512, with gaps 513 in between (see FIG. 9). FIG. 9 illustrates an example of a configuration where four split members 511 are arranged with the same gaps 513 in between in the direction around the center axis AX, but the configuration is not limited to this example. There may be three or less or five or more split members 511. At least one of the gaps 513 may be different from another one.

The gap 513 described above is a portion free of thermal deformation. As described above, the plate-like member 510 has a configuration including the gaps 513 as portions free of thermal deformation in the direction around the center axis AX, in addition to the opening portion of the inner side portion 512. Thus, with the plate-like member 510, the thermal deformation can be more effectively suppressed.

As described above, in the pipe supporting structure 500 according to the present embodiment, the plate-like member 510 has the plurality of split members 511 arranged in the axial direction of the center axis AX, to surround the inner side portion 12, with the gaps 513 provided in between. With this configuration, the portion where the thermal deformation may occur can be further reduced in the plate-like member 510, whereby the thermal deformation can be more effectively suppressed. Thus, damaging of the pipe supporting structure 500 due to thermal stress can be more reliably suppressed.

Figure 10:
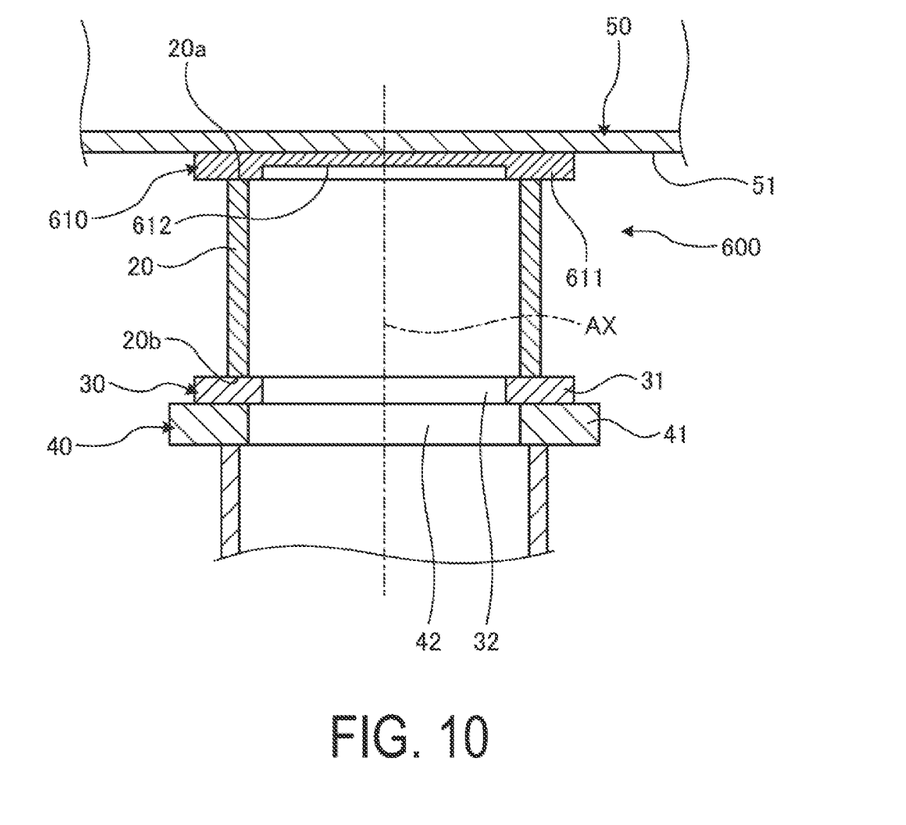
FIG. 10 is a diagram illustrating a cross-sectional configuration of another example of a pipe supporting structure.

FIG. 10 is a diagram illustrating a cross-sectional configuration of another example of a pipe supporting structure. A pipe supporting structure 600 as illustrated in FIG. 10 includes a plate-like member 610, the tube-like member 20, the slide plate 30, and the base 40. In the plate-like member 610 of the pipe supporting structure 600, a thickness of an inner side portion 612 is smaller than a thickness of a supported region 611. More specifically, the inner side portion 612 is formed with a surface on the tube-like member 20 side recessed. The inner side portion 612 may be formed with a surface on the pipe 50 side recessed, or with surfaces on both the tube-like member 20 side and the pipe 50 side recessed.

As described above, in the plate-like member 610 of the pipe supporting structure 600 according to the present embodiment, the thickness of the inner side portion 612 is smaller than the thickness of the supported region 611 in the axial direction. With this configuration, the portion where the thermal deformation may occur can be further reduced in the plate-like member 610, whereby damaging of the pipe supporting structure 600 due to thermal stress can be more reliably suppressed.

Figure 11:
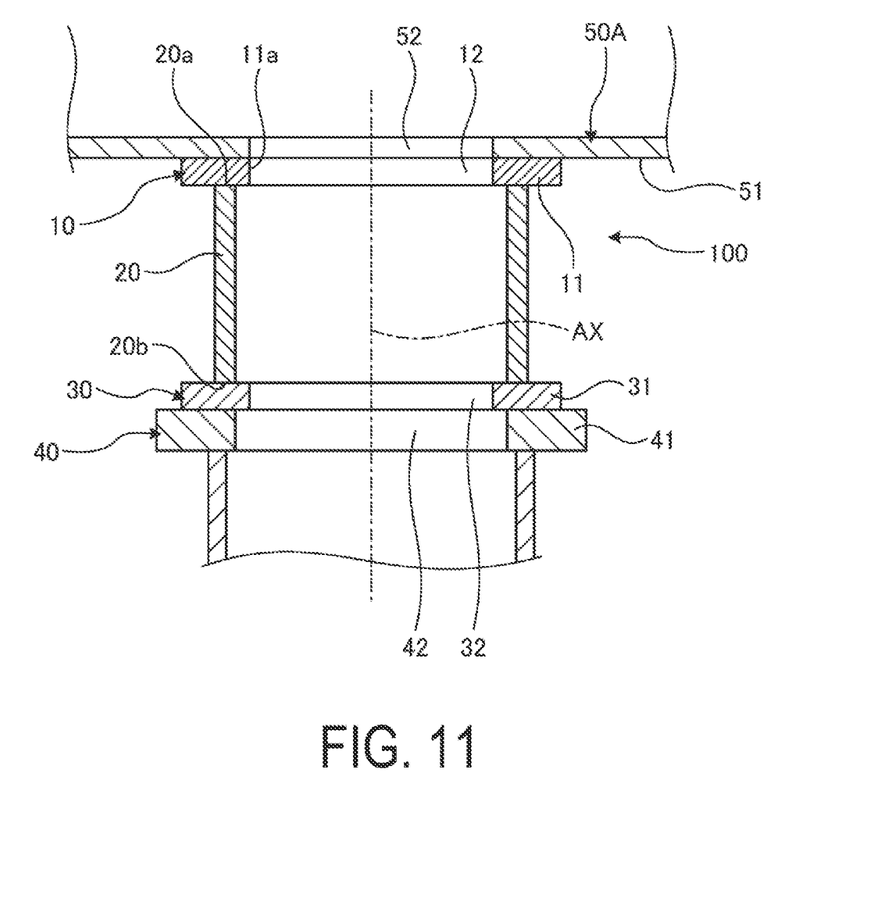
FIG. 11 is a diagram illustrating a cross-sectional configuration of another example of a pipe and a pipe supporting structure.

FIG. 11 is a diagram illustrating a cross-sectional configuration of another example of a pipe and a pipe supporting structure. In the example illustrated in FIG. 11, a pipe 50A has an opening 52. While the pipe supporting structure 100 is illustrates as an example of the pipe supporting structure that supports the pipe 50A, the structure is not limited to this and any of the pipe supporting structures 200, 300, 400, 500, and 600 described above may be used. The pipe 50A has the opening 52 at a portion corresponding to the supported portion 11 of the plate-like member 10. The opening 52 is formed to have dimensions corresponding to that of the inner side portion 12 of the plate-like member 10. The pipe 50A may have any configuration as long as the portion corresponding to the plate-like member 10 has a heat capacity per unit volume smaller than those in other portions. Thus, the pipe 50A may have a thin portion (recess portion) or a porous portion in the portion corresponding to the plate-like member 10, instead of the opening 52. When the pipe 50A is provided with the recess portion, the recess portion may be provided on the inside surface side or the outside surface side of the pipe 50A.

When the pipe supporting structure 100 is provided to the pipe 50A, first of all, the opening 52 of the pipe 50A and the inner side portion 12 of the plate-like member 10 are aligned. Then, the plate-like member 10 is brought into contact with the outside surface 51 of the pipe 50A, and the plate-like member 10 is joined to the pipe 50A by full penetration welding. Then, the tube-like member 20 is joined to the supported portion 11 of the plate-like member 10 by full penetration welding.

As described above, the portion of the pipe 50A corresponding to the plate-like member 10 has a smaller heat capacity per unit volume than other portions, whereby thermal deformation on the pipe 50A side can be suppressed. For example, when the pipe 50A is provided with the opening 52, the pipe supporting structure 100 is provided at the position corresponding to the opening 52. Thus, a portion where thermal deformation may occur can be made smaller on the pipe 50A side, whereby damaging of the pipe supporting structure 100 due to thermal stress can be suppressed.

The technical scope of the present invention is not limited to the above-mentioned embodiments, and can be changed as appropriate without departing from the scope of the present invention. For example, in the embodiment described above, an example of a configuration is described where the pipe 50, 50A is provided in the duct 60, but the duct 60 should not be construed in a limiting sense. The pipe 50, 50A may be placed in a pipe other than the duct 60 or in a space in a furnace or a room, not in the pipe, as long as the pipe 50, 50A is placed in an environment where the temperature difference between the inside and the outside is, for example in a range of 100° C. or greater and greater than the temperature difference between summer and winter.

Furthermore, in the embodiment described above, an example is described where the gas G1 supplied to the duct 60 is high-temperature gas, and the gas G2 flowing in the pipe 50, 50A is low-temperature gas, however, this is not limited thereto. For example, the gas G2 may have a higher temperature than the gas G1. When the temperature is high and low respectively inside and outside the pipe 50, 50A, there may by a temperature difference between the pipe 50, 50A and the plate-like member 10. Still, with the configuration according to the embodiment described above, the thermal deformation of the plate-like member 10 due to this temperature difference can be suppressed. Also when the gas G2 has a higher temperature than the gas G1, the predetermined temperature difference that may occur between the inside and the outside of the pipe 50, 50A is, for example, 100° C. or greater, which is greater than a temperature difference between summer and winter as in the case described above.

REFERENCE SIGNS LIST 10, 410, 510, 610 Plate-like member
11 Supported portion
11a Inside surface
12, 14,512, 612 Inner side portion
13, 23 Weld portion
20,320 Tube-like member
20a, 20b End surface
21 First tube-like member
22 Second tube-like member
30 Slide plate (second plate-like member)
31, 41 Support portion
32, 42 Opening portion
40 Base
50, 50A Pipe
51 Outside surface
52 Opening
60 Duct
100, 200, 300, 400, 500, 600 Pipe supporting structure
511 Split member
513 Gap
611 Supported region
AX Center axis
G1, G2 Gas

The invention claimed is:

1. A pipe unit comprising:
a first pipe;
a second pipe located inside the first pipe;
a plate member in contact with an outside surface of the second pipe;
a tube member having a tubular shape and fixed to the plate member such that a first end portion in an axial direction of a center axis of the tube member is in contact with the plate member; and
a base configured to support a second end portion of the tube member in the axial direction,
wherein the plate member includes a supported portion supported by the tube member, and an inner side portion surrounded by the supported portion, and
wherein the inner side portion has a smaller heat capacity per unit volume than the supported portion.

2. The pipe unit according to claim 1, wherein:
a first gas is to flow in the first pipe,
a second gas different from the first gas in temperature is to flow in the second pipe, and the second pipe is to be in an environment where a predetermined temperature difference occurs between an inside of the second pipe and an inside of the first pipe that is outside of the second pipe due to a flow of the first gas and the second gas.

3. The pipe unit according to claim 1, wherein:
a first gas is to flow in the first pipe,
a second gas different from the first gas in temperature is to flow in the second pipe, and the second pipe is to be in an environment where a temperature difference of 100° C. or greater occurs between an inside of the second pipe and an inside of the first pipe that is outside of the second pipe due to a flow of the first gas and the second gas.

4. The pipe unit according to claim 1, wherein the plate member has a circular shape as viewed in the axial direction.

5. The pipe unit according to claim 1, wherein the inner side portion of the plate member is open.

6. The pipe unit according to claim 5, wherein the plate member has an inside surface facing the inner side portion, the inside surface to be welded to the second pipe.

7. The pipe unit according to claim 5, wherein the supported portion of the plate member includes a plurality of split members arranged in a direction around the center axis with a gap between the split members, the split members being arranged to surround the inner side portion.

8. The pipe unit according to claim 1, wherein the tube member comprises a first tube member and a second tube member welded to each other, the first tube member being placed on a side close to the plate member in the axial direction, the second tube member being placed on a side close to the base in the axial direction.

9. The pipe unit according to claim 1, wherein the inner side portion of the plate member is a porous inner side portion.

10. The pipe unit according to claim 1, wherein a thickness of the inner side portion of the plate member is smaller than a thickness of the supported portion of the plate member in the axial direction.

11. The pipe unit according to claim 1, wherein the plate member is a first plate member, the pipe supporting structure further comprising a second plate member between the tube member and the base, wherein the second plate member is open on an inner side of a support portion supporting the tube member.

12. The pipe unit according to claim 1, wherein the base is open on an inner side of a base-side support portion supporting the tube member.

13. The pipe unit according to claim 1, wherein a portion of the second pipe corresponding to a location of contact with the plate member has a smaller heat capacity per unit volume than another portion of the second pipe.

14. A gas turbine comprising the pipe unit according to claim 1, wherein:
the first pipe is an exhaust duct, and
the second pipe is an extracted air pipe.

15. The pipe unit according to claim 1, wherein the base is on a wall of the first pipe, and the plate member and the tube member are arranged inside the first pipe.

* * * * *